(12) United States Patent
Kawai et al.

(10) Patent No.: US 7,147,915 B2
(45) Date of Patent: Dec. 12, 2006

(54) MICROCAPSULE AND ITS USES

(75) Inventors: Hideyuki Kawai, Suwa (JP); Kazuhiro Anan, Amagasaki (JP); Makoto Matsumoto, Suita (JP); Mitsuo Kushino, Hyogo (JP)

(73) Assignees: Seiko Epson Corporation, Tokyo (JP); Nippon Shokubai Co., Ltd., Osaka (JP)

( * ) Notice: Subject to any disclaimer, the term of this patent is extended or adjusted under 35 U.S.C. 154(b) by 259 days.

(21) Appl. No.: 10/790,092

(22) Filed: Mar. 2, 2004

(65) Prior Publication Data
US 2005/0007649 A1    Jan. 13, 2005

(30) Foreign Application Priority Data
Mar. 6, 2003    (JP) .............................. 2003-060500

(51) Int. Cl.
*B01J 13/02*    (2006.01)
*G02B 26/00*    (2006.01)

(52) U.S. Cl. ............................. 428/402.2; 428/402.21; 359/296; 264/4.1; 264/4.3

(58) Field of Classification Search ............... 428/402, 428/402.21; 359/296; 264/4.1, 4.3
See application file for complete search history.

(56) References Cited

U.S. PATENT DOCUMENTS

| | | | |
|---|---|---|---|
| 5,185,155 A | | 2/1993 | Behan et al. |
| 5,500,223 A | * | 3/1996 | Behan et al. ............... 424/451 |
| 5,804,298 A | * | 9/1998 | Moy ........................... 428/327 |
| 6,106,946 A | * | 8/2000 | Tanaka et al. ........... 428/402.2 |
| 6,149,953 A | * | 11/2000 | Redding, Jr. .................. 426/98 |
| 6,537,583 B1 | * | 3/2003 | Dupuis et al. .............. 424/490 |
| 6,654,159 B1 | * | 11/2003 | Kawai et al. ................ 359/296 |
| 6,780,507 B1 | * | 8/2004 | Toreki et al. .......... 428/402.21 |

FOREIGN PATENT DOCUMENTS

| | | |
|---|---|---|
| EP | 0 478 326 | 4/1992 |
| JP | 59-48773 | 3/1984 |
| JP | 63-32560 | 2/1988 |
| JP | 4-265149 | 9/1992 |
| JP | 2000-66249 | 3/2000 |

* cited by examiner

*Primary Examiner*—David W. Wu
*Assistant Examiner*—Satya B. Sastri
(74) *Attorney, Agent, or Firm*—Roylance, Abrams, Berdo & Goodman, L.L.P.

(57) ABSTRACT

Objects of the present invention are to provide a microcapsule which can effectively and easily achieve: the prevention and adjustment of the bleeding-out of the encapsulated liquid substance from the capsule shell; and the enhancement and adjustment of the physical strength of the microcapsule; and to further provide a sheet and an electrophoretic display, both of which involve using the above microcapsules. As means of achieving these objects, the microcapsule according to the present invention is a microcapsule comprising a shell and a liquid substance that is encapsulated in the shell, with the microcapsule being characterized in that the shell contains fine particles having particle diameters of not larger than 1 μm. And the sheet according to the present invention comprises the microcapsules according to the present invention and a binder resin or comprises the microcapsules according to the present invention and a base material. And the electrophoretic display according to the present invention has as a constitutional portion a portion which includes opposite electrode films and the microcapsules according to the present invention, wherein at least either one of the opposite electrode films is transparent, and wherein the microcapsules are disposed between the opposite electrode films.

9 Claims, 3 Drawing Sheets

MICROCAPSULE AND ITS USES

BACKGROUND OF THE INVENTION

1. Technical Field

The present invention relates to a microcapsule comprising a shell (which serves as a partition layer) and a liquid substance that is encapsulated in the shell. Furthermore, the present invention relates to a microcapsule comprising the capsule shell and a dispersion (dispersion liquid) that is encapsulated as the liquid substance in the capsule shell, wherein the dispersion includes a solvent and electrophoretic fine particles that are dispersed in the solvent. Also, the present invention relates to a sheet involving using the above microcapsules and an electrophoretic display involving using the above microcapsules.

2. Background Art

A microcapsule has hitherto been well known wherein the microcapsule comprises a shell (capsule shell) (which serves as a partition layer) and an oily liquid substance (including such as fine-particle dispersion besides simple solution) that is encapsulated in the shell. Their usefulness is recognized in various uses such as: various sheets (e.g. non-carbon paper, pressure-measuring films); electrophoretic displays; and agents for controlled release of such as medicines and agricultural chemicals.

Usually, because the capsule shell which is a partition of the microcapsule is very thin, there occurs a phenomenon such that the liquid substance (particularly, a liquid component), which is a core (nucleus) substance and also an encapsulated material, bleeds out of the capsule shell. It is such as the above agents for controlled release that positively utilize this phenomenon. On the other hand, for example, as to uses which need to firmly retain the encapsulated liquid substance (e.g. microcapsules for electrophoretic displays), the above bleeding-out causes disadvantages such as: peripheral contamination; deterioration of powder properties of the microcapsule; cohesion of microcapsules; and deterioration and inferiority of normal or firm adhesion of the microcapsule to such as base materials; and is therefore problematic. In addition, also as to the microcapsule utilized for such as the above agents for controlled release, the encapsulated state of the liquid substance needs to be retained on a definite level before the use (e.g. during the preparation, preservation, and transportation) of the microcapsule, setting aside during and after the use of the microcapsule. However, it has not been easy to properly adjust the degree of the prevention and inhibition of the bleeding-out with consideration given to circumstances of during the use of the microcapsule.

Thus, as means of solving these problems, there have already been disclosed: an art in which an interfacial polymerization method and an In-situ polymerization method are combined together to thereby provide the capsule shell with a double structure, thus preventing the bleeding-out (e.g. refer to JP-A-032560/1988 (Kokai)); and an art in which a PVA (polyvinyl alcohol) layer is formed at the boundary between the core substance and the capsule shell to thereby enhance the durability to the bleeding-out (e.g. refer to JP-A-048773/1984 (Kokai)). However, considering these arts from levels demanded from such as recent years' technical levels and product quality, then they cannot be said to be satisfactory solutions. In addition, these arts cannot be said to be easy in their operational procedures, either, and are therefore inferior also in the economical advantages and the productivity.

In addition, as to the microcapsule, usually, also in demand for various uses and technical fields (enhancement of such as softness, firm adhesion, and further, facility in electrically charging the particles inside the capsule), it is required that the capsule shell should be made very thin, similarly to the above. However, there has been a problem such that, in compensation therefor, it is impossible to obtain sufficient physical strength. In addition, for example, some of uses such as non-carbon paper and pressure-measuring films have an object to finally destroy the capsule shell to thus make the encapsulated liquid substance flow out. However, also as to these, for the prevention of a problem such that the destruction unfavorably occurs other than when needed, the microcapsule needs to be provided with appropriate physical strength. However, its adjustment has not been easy. Therefore, it has hitherto always been made a subject that, even in the case where the capsule shell is made very thin, the physical strength to external loads such as stirring and application of pressure such as during the preparation and preservation of the microcapsule or such as during and after the use of the microcapsule for various uses should easily be enhanced and adjusted. Furthermore, also from the viewpoint of recent years' technical levels, more excellent ones are demanded.

SUMMARY OF THE INVENTION

1. Objects of the Invention

Thus, an object of the present invention is to provide a microcapsule which can effectively and easily achieve: the prevention and adjustment of the bleeding-out of the encapsulated liquid substance from the capsule shell; and the enhancement and adjustment of the physical strength of the microcapsule. In addition, another object of the present invention is to provide a sheet and an electrophoretic display, both of which involve using the above microcapsules.

2. Disclosure of the Invention

The present inventors diligently studied to solve the above problems. As a result, the present inventors have conceived as follows: to make fine particles exist in the capsule shell constituting the microcapsule is a way that, even while the same thinness of the capsule shell as conventional and the functions, actions and effects (e.g. softness, firm adhesion) owing to this thinness are maintained, the aforementioned bleeding-out can effectively be prevented and adjusted, and also, the enhancement and adjustment of the physical strength can easily be achieved. And then the present inventors have completed the present invention by confirming that such a novel art as have never been seen before could solve the above problems all at once.

In addition, as to the above novel art in which the capsule shell is made to contain the fine particles, if fine particles having specific functions and properties are used as the fine particles, then the microcapsule itself can also be provided with the same functions and properties. For example, it is possible to enable the microcapsule to exercise such as tackiness, firm adhesion, releasibility, and optical properties. Therefore, if the kind and amount of the fine particles to be used are appropriately selected with consideration given to such as use fields and final products, then a microcapsule with desired properties can easily be obtained.

Further surprisingly, as to the above microcapsule of which the capsule shell is made to contain the fine particles, its filtration facility has been found to be a greatly enhanced one. Specifically, in the case where only the microcapsule is isolated (solid-liquid-separated) from a liquid resultant from the preparation of the microcapsule, usually, suction filtration or spontaneous filtration is carried out. The time needed for completing this filtration is greatly shortened. Accompanying this, the productivity of the microcapsule can greatly be enhanced.

That is to say, a microcapsule according to the present invention is a microcapsule comprising a shell and a liquid substance that is encapsulated in the shell, with the microcapsule being characterized in that the shell contains fine particles having particle diameters of not larger than 1 µm.

In addition, as to the above microcapsule according to the present invention, it is possible that the fine particles are organic fine particles, it is possible that the organic fine particles are fine polymer particles, and it is possible that the liquid substance is a dispersion including a solvent and electrophoretic fine particles that are dispersed in the solvent.

A sheet according to the present invention comprises the microcapsules according to the present invention and a binder resin or comprises the microcapsules according to the present invention and a base material.

An electrophoretic display according to the present invention has as a constitutional portion a portion which includes opposite electrode films and the microcapsules according to the present invention, wherein at least either one of the opposite electrode films is transparent, and wherein the microcapsules are disposed between the opposite electrode films.

BRIEF DESCRIPTION OF THE DRAWINGS

An explanation of the symbols is as follows.
1: Microcapsule
2: Shell
3: Fine particle
4: Liquid substance

DETAILED DESCRIPTION OF THE INVENTION

Hereinafter, detailed descriptions are given about the microcapsule, sheet, and electrophoretic display according to the present invention. However, the scope of the present invention is not bound to these descriptions. And other than the following illustrations can also be carried out in the form of appropriate modifications of the following illustrations within the scope not departing from the spirit of the present invention.

[Microcapsule]:

As is aforementioned, the microcapsule according to the present invention is a microcapsule comprising a shell (capsule shell) and a liquid substance that is encapsulated in the shell, wherein the shell contains fine particles having particle diameters of not larger than 1 µm.

The capsule shell, referred to in the present invention, is a capsule shell which contains fine particles. It is favorable that the capsule shell portion other than these fine particles can be formed using the same as starting materials for capsule shells of hitherto publicly known microcapsules. Specific favorable examples of usable starting materials include: in the case of using a coacervation method, anionic substances (e.g. gum arabic, sodium alginate, copolymers of styrene-maleic anhydride, copolymers of vinyl methyl ether-maleic anhydride, phthalate esters of starch, and poly(acrylic acid)); in the case of using an In-situ polymerization method, melamine-formalin resins (melamine-formalin prepolymers) and radically polymerizable monomers; and, in the case of using an interfacial polymerization method, combinations of hydrophilic monomers (e.g. polyamines, glycols, and polyphenols) and hydrophobic monomers (e.g. polybasic acid halides, bishaloformate, and polyisocyanates), from which capsule shells of such as polyamides, epoxy resins, polyurethanes, and polyureas are formed.

It is also possible to further add such as polyamines to these starting materials for the capsule shell, whereby there can be obtained microcapsules having a capsule shell which is excellent in such as heat-resistant preservability. The amount of such as polyamines to be used will do if it is to such an extent as not to extremely damage the desirable shell properties derived from the above starting materials for the capsule shell.

Favorable examples of the above polyamines include: aliphatic amines, such as ethylenediamine, diethylenetriamine, triethylenetetramine, tetraethylenepentamine, 1,3-propylenediamine, and hexamethylenediamine; epoxy compound addition products from aliphatic polyamines, such as poly(1 to 5)alkylene($C_2$ to $C_6$)polyamine-alkylene($C_2$ to $C_{18}$) oxide addition products; aromatic polyamines, such as phenylenediamine, diaminonaphthalene, and xylylenediamine; alicyclic polyamines such as piperazine; and heterocyclic diamines such as 3,9-bis-aminopropyl-2,4,8,10-tetraoxaspiro-[5.5]undecane. These may be used either alone respectively or in combinations with each other.

The fine particles, which are contained in the capsule shell referred to in the present invention, are not especially limited. However, for example, various fine particles such as organic fine particles, inorganic fine particles, and organic-inorganic-composite fine particles are usable. Above all, cases of using the organic fine particles or the organic-inorganic-composite fine particles are preferable in that they can more enhance such as normal adhesion (degree of fixation) and firm adhesion to various substrates (e.g. electrode substrates) and base materials. In addition, there are preferred such fine particles as have either affinity to the substances that form the capsule shell portion other than the fine particles or functional groups which can chemically bond to the above substances.

Favorable examples of the above organic fine particles include fine polymer particles, fine organic-pigment particles, and fine natural-polymer particles. The organic fine particles are preferable to other fine particles in point of securing or enhancing the firm adhesion to base materials and substrates. Above all preferable are the fine polymer particles, which enable sufficient firm adhesion of the microcapsules to base materials even in the case where no binder resin is used, to say nothing of the case where the microcapsules are mixed with a binder resin and then made to firmly adhere to base materials.

Examples of the fine polymer particles include fine particles including such as: homopolymers of styrene and substituted styrene (e.g. polystyrene, poly(P-chlorostyrene), poly(vinyltoluene)); styrenic pluralistic copolymers (e.g. copolymers of styrene-P-chlorostyrene, copolymers of styrene-propylene, copolymers of styrene-vinyltoluene, copolymers of styrene-vinylnaphthalene, copolymers of styrene-methyl acrylate, copolymers of styrene-ethyl acrylate, copolymers of styrene-butyl acrylate, copolymers of styrene-octyl acrylate, copolymers of styrene-methyl methacrylate, copolymers of styrene-ethyl methacrylate, copolymers of styrene-butyl methacrylate, copolymers of styrene-methyl α-chloromethacrylate, copolymers of styrene-acrylonitrile, copolymers of styrene-vinyl methyl ether, copolymers of styrene-vinyl ethyl ether, copolymers of styrene-vinyl methyl ketone, copolymers of styrene-butadiene, copolymers of styrene-isoprene, copolymers of styrene-acrylonitrile-indene, copolymers of styrene-maleic acid, copolymers of styrene-maleate ester, copolymers of styrene-acrylate ester-methacrylate ester, and copolymers of styrene-acrylate ester-dibutyl fumarate); polymethacrylates, poly (butyl methacrylate), poly(vinyl chloride), poly(vinyl acetate), poly(methylethylene), polyurethanes, polyamides, polyester resins, polyolefins, epoxy resins, poly(vinyl butyral), poly(acrylic acid) resins, rosins, modified rosins, terpene resins, phenol resins, aliphatic or alicyclic hydrocarbon resins, and aromatic petroleum resins.

Methods for obtaining these fine polymer particles are not especially limited. However, specific effective examples thereof include emulsion polymerization methods, microsuspension polymerization methods, or methods in which melted resins are formed into fine particles in solvents in which the resins are insoluble. In addition, the resin properties of these fine polymer particles are not especially limited. However, for example, in the case where the microcapsules according to the present invention are mixed and dispersed into a binder to form a paint and then used, it is favorable to use fine polymer particles having the same as the properties of the above binder, because therefrom there can be obtained an effect such that the coatability and the firm adhesion are enhanced.

Examples of the fine organic-pigment particles include fine particles including such as Fast Yellow, Chromophthal Yellow, Hansa Yellow, Permanent Red, Palm Red, Chromophthalo Scarlet Red, Phthalocyanine Blue, Indanthrene Blue, Phthalocyanine Green, Carbon Black, and Aniline Black.

Favorable examples of the above inorganic fine particles include fine inorganic-pigment particles, colloidal inorganic fine particles, magnetic fine particles, and metallic fine particles.

Examples of the fine inorganic-pigment particles include fine particles including such as Talc, Titanium Oxide, Zinc Oxide, Clay, Silica, Titanium Yellow, Ferric Oxide Red, Cerlian Blue, and Emerald Green.

Examples of the colloidal inorganic fine particles include fine particles including such as colloidal silica, colloidal zinc oxide, and colloidal titanium oxide.

Examples of the magnetic fine particles include fine particles including such as magnetite and $Fe_3O_4$.

Examples of the metallic fine particles include fine particles including such as gold, silver, platinum, copper, aluminum, tungsten, and palladium.

The above organic-inorganic-composite fine particles will do if they are fine particles having therein a structural portion deriving from an organic substance and a structural portion deriving from an inorganic substance. Thus, there is no especial limitation on them.

As to the various fine particles which are enumerated above as the fine particles contained in the capsule shell referred to in the present invention, only one kind may be used, or more than one kind may jointly be used.

In addition, as the fine particles contained in the capsule shell, it is also possible to use those which are the above-enumerated various fine particles and of which the surfaces have been treated with coupling agents or polymers having functional groups.

Favorable examples of the coupling agents include silane coupling agents, titanate coupling agents, and aluminum coupling agents.

The fine particles, contained in the capsule shell referred to in the present invention, are fine particles having particle diameters of not larger than 1 μm, wherein the particle diameters are favorably in the range of 0.001 to 0.8 μm, more favorably 0.01 to 0.5 μm. Because the above particle diameters are not larger than 1 μm, the strength of the microcapsule can easily effectively be enhanced. In addition, in the case where the particle diameters are larger than 1 μm, the microcapsule shell cannot be made to contain the fine particles in such an amount as enables the exercise of the aforementioned effects of the present invention, thus resulting in failure to sufficiently obtain the effects. In addition, there is a possibility that the strength of the microcapsule may rather be deteriorated.

In the capsule shell referred to for the microcapsule according to the present invention, the content of the fine particles relative to the entire capsule shell is favorably in the range of 0.1 to 50 weight %, more favorably 0.5 to 50 weight %, still more favorably 1 to 50 weight %, though not especially limited. In the case where the above content of the fine particles is lower than 0.1 weight %, there is a possibility that the aforementioned effects of the present invention may not sufficiently be obtained. Besides, only a small amount of fine particles exist at the surface of the microcapsule (i.e. surface of the capsule shell) and therefore, particularly in the case where the fine particles are organic fine particles (favorably, fine polymer particles), there is a possibility that the aforementioned excellent firm adhesion to base materials may not sufficiently be exercised. On the other hand, in the case where the above content of the fine particles is higher than 50 weight %, there is a possibility that the properties which are usually demanded to microcapsules cannot be retained.

Though not especially limited, the thickness (thickness in a state containing the fine particles) of the capsule shell referred to for the microcapsule according to the present invention is favorably in the range of 0.1 to 5 μm, more favorably 0.1 to 4 μm, still more favorably 0.1 to 3 μm. In the case where the above thickness is less than 0.1 μm, there is a possibility that, even if the capsule shell is made to contain the fine particles, its various effects as aforementioned may not sufficiently be obtained. In the case where the above thickness is more than 5 μm, there is a possibility that the properties which are usually demanded to microcapsules cannot be retained, or that the effects by making the capsule shell contain the fine particles may not sufficiently be obtained, thus resulting in the inferiority in the economical advantages.

Figure 1:
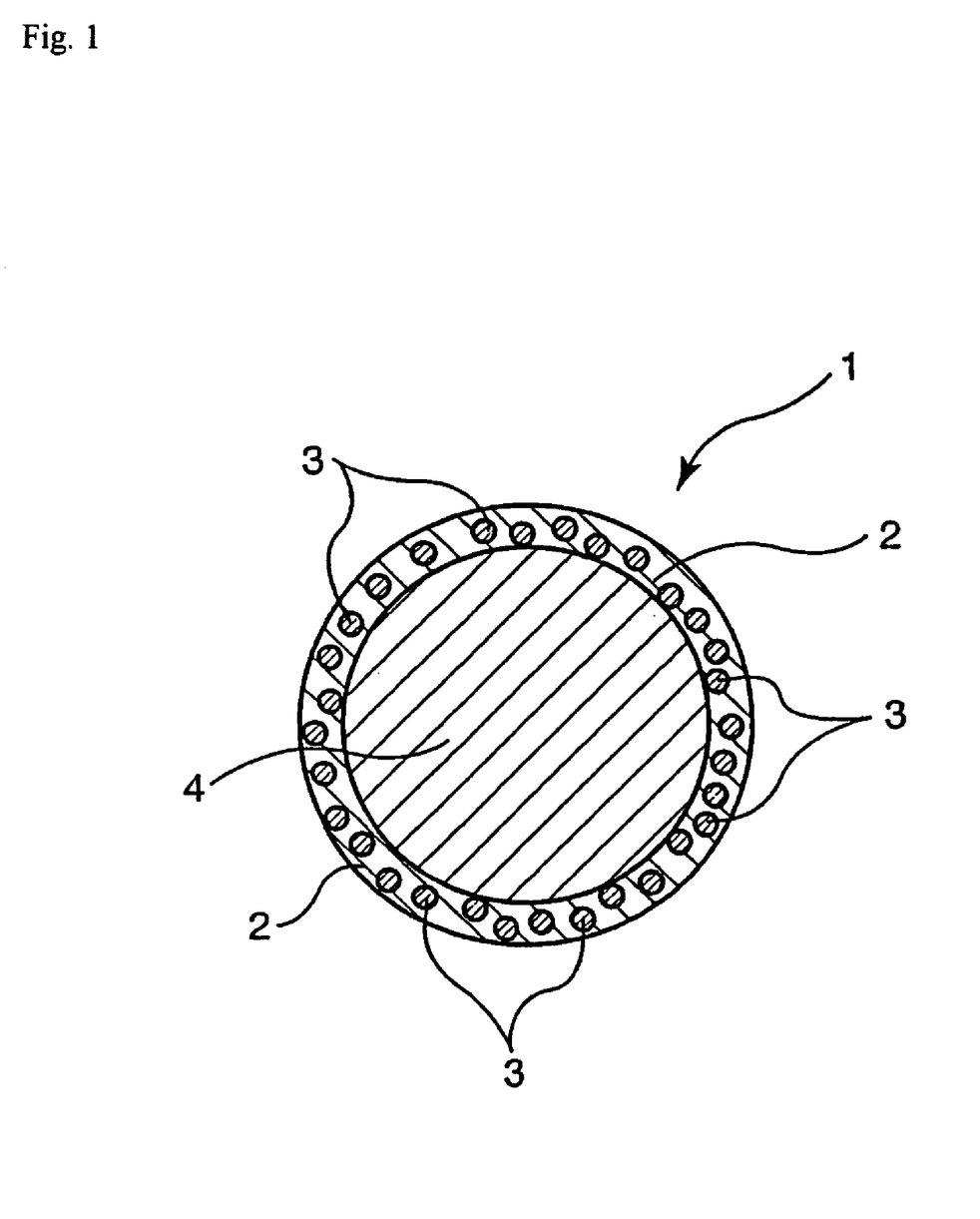
FIG. 1 is a schematic sectional view illustrating a working example of the microcapsule according to the present invention.
Figure 2:
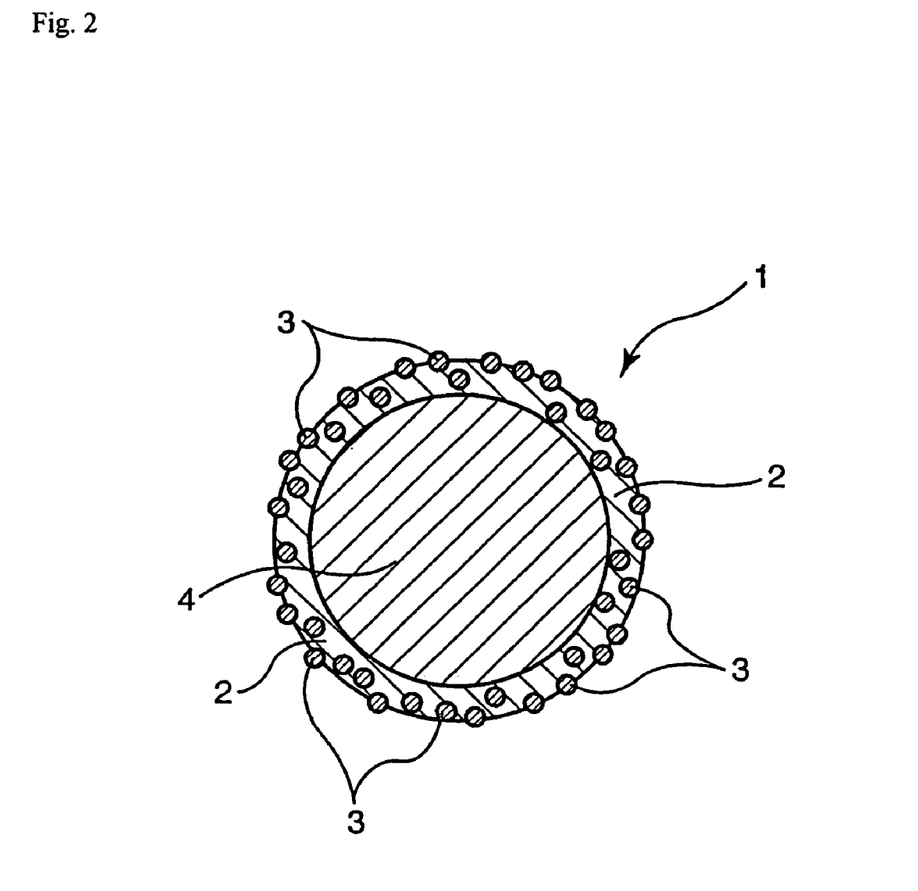
FIG. 2 is a schematic sectional view illustrating a working example of the microcapsule according to the present invention.
Figure 3:
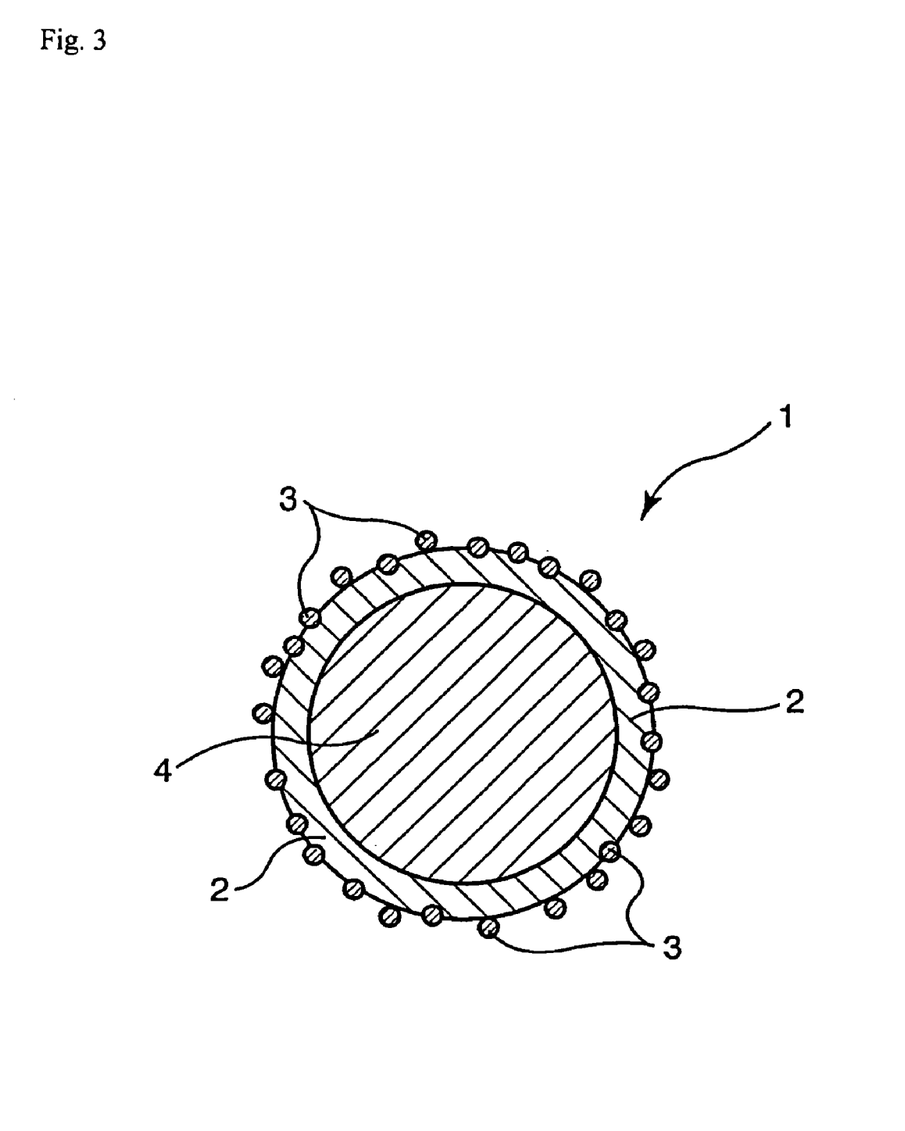
FIG. 3 is a schematic sectional view illustrating a working example of the microcapsule according to the present invention.

As to the capsule shell referred to for the microcapsule according to the present invention, (at least a part of) the fine particles made to be contained in the capsule shell may be in a state exposed partially or entirely outside the capsule shell surface (in the case of a fine particle being in the entirely exposed state, it is favorable that this fine particle adheres firmly to the shell surface and, in the present invention, such a state is also included in modes of being contained in the shell) (refer to FIGS. 2 and 3), or all the above fine particles are in a state embedded entirely in the capsule shell (refer to FIG. 1). Thus, there is no limitation.

However, particularly in the case where the fine particles are organic fine particles (favorably, fine polymer particles), the former state is preferable, considering that the aforementioned excellent firm adhesion to base materials can sufficiently be exercised.

The liquid substance, referred to in the present invention, is encapsulated in the capsule shell containing the fine particles and is a core (nucleus) substance of the microcapsule according to the present invention and, favorably, is hydrophobic as a whole. The above liquid substance may merely be one or more kinds of liquids or a mixed liquid, or may be a solution or slurry solution including the above liquid and a solid substance that is dissolved in the liquid. Thus, the liquid substance is not especially limited. In addition, the liquid substance may be a material (what is called dispersion (dispersion liquid)) including the above liquid or solution and a solid substance (such as fine particles (e.g. electrophoretic fine particles)) that is dispersed in the liquid or solution, or may be a material (what is called mixture) including the above liquid or solution and the above solid substance that is mixed with the liquid or solution. The liquid substance, as the above dispersion, is, for example, used in the case of obtaining microcapsules for electrophoretic displays.

In the preparation of the above liquid substance, such as the kinds and numbers of the liquid and the solid substance to be used will do if they are appropriately selected with consideration given to such as functions demanded in use fields of the resultant microcapsule or demanded to its final products. Thus, there is no especial limitation.

The liquid substance is favorably that which is oily as a whole and can disperse in the form of oil drops in an aqueous medium.

Hereinafter, while specifically citing examples, descriptions are given about the liquid substance used in the case of obtaining the microcapsules for electrophoretic displays, namely, the dispersion (dispersion liquid) including a solvent and electrophoretic fine particles that are dispersed in the solvent.

For carrying out the electrophoretic displaying, usually, there are the following methods: a method in which the displaying is carried out by contrast in color between the solvent and the electrophoretic fine particle in the dispersion liquid; and a method in which the displaying is carried out by contrast in color between at least two kinds of electrophoretic fine particles.

The solvent used for the above dispersion liquid will do if it is a solvent used conventionally and generally for dispersion liquids for electrophoretic displays. Therefore, the solvent is not especially limited. However, high-insulating organic solvents are favorable.

Favorable examples of the high-insulating organic solvents include one member alone or mixtures selected from among: aromatic hydrocarbons, such as o-, m-, or p-xylene, toluene, benzene, dodecylbenzene, hexylbenzene, phenylxylylethane, and naphthenic hydrocarbons; and aliphatic hydrocarbons, such as cyclohexane, n-hexane, kerosine, and paraffinic hydrocarbons. Of the above, such as long-chain-alkylbenzenes (e.g. dodecylbenzene and hexylbenzene) and phenylxylylethane are more favorable because they have a high boiling point and also a high flash point, and further have almost no toxicity. These solvents may be used either alone respectively or in combinations with each other.

In the case of coloring the solvent, it is preferable to color the solvent to such a degree that there can be obtained a sufficient contrast to the color of the electrophoretic fine particle (e.g. white if it is the fine titanium oxide particle).

In the case where the solvent is a colored one, there is no especial limitation on the dye used for the coloring. However, oil-soluble dyes are favorable, and such as azo dyes and anthraquinone dyes are more favorable particularly in respect of being easy to use. Specific favorable examples thereof include: as yellow dyes, azo compounds (e.g. Oil Yellow 3G (produced by Orient Chemical Co., Ltd.)); as yellowish brown dyes, azo compounds (e.g. Fast Orange G (produced by BASF)); as blue dyes, anthraquinones (e.g. Macrorex Blue RR (produced by Bayer)); as green dyes, anthraquinones (e.g. Sumiplast Green G (produced by Sumitomo Chemical Co., Ltd.)); as brown dyes, azo compounds (e.g. Oil Brown GR (produced by Orient Chemical Co., Ltd.)); as red dyes, azo compounds (e.g. Oil Red 5303 (produced by Arimoto Chemical Co., Ltd.) and Oil Red 5B (produced by Orient Chemical Co., Ltd.)); as purple dyes, anthraquinones (e.g. Oil Violet #730 (produced by Orient Chemical Co., Ltd.)); as black dyes, azo compounds (e.g. Sudan Black X60 (produced by BASF)); and mixtures of Macrorex Blue FR as an anthraquinone (produced by Bayer) and Oil Red XO as an azo compound (produced by Kanto Chemical Co., Ltd.). These dyes may be used either alone respectively or in combinations with each other.

The electrophoretic fine particles used for the above dispersion liquid will do if they are electrophoretic pigment particles, namely, colored particles that display plus or minus polarity in the dispersion liquid. Although there is no especial limitation on their kinds, specifically there are favorably used such as white particles (e.g. Titanium Oxide) and black particles (e.g. Carbon Black and Titanium Black), and there may also be used other particles as mentioned below. These may be used either alone respectively or in combinations with each other.

In the case of using the fine particles of the titanium oxide, there is no especial limitation on the kind of the titanium oxide. That will do if it is titanium oxide as generally used as a white pigment, and the titanium oxide may be either a rutile type or anatase type. However, in the case of considering such as discoloration of colorants due to photoactive performance of the titanium oxide, it is favorable that the titanium oxide is the rutile type which is low in photoactive performance, and it is more favorable that the titanium oxide is titanium oxide as processed by such as Si treatment, Al treatment, Si—Al treatment, or Zn—Al treatment for further lowering the photoactive performance.

As the electrophoretic fine particles, other particles besides the above fine titanium oxide particles, Carbon Black, and Titanium Black may be used together. In addition, the above other particles may be used instead of such as the titanium oxide. The above other particles are, favorably, pigment particles similarly to such as the fine titanium oxide particles. In addition, there is not always necessity for the above other particles to have the electrophoretic ability similarly to such as the fine titanium oxide particles. If necessary, the electrophoretic ability may be given by some hitherto publicly known method.

Although there is no especial limitation on the above other particles, specific favorable examples thereof include: as white particles other than the above titanium oxide, inorganic pigments (e.g. Barium Sulfate, Zinc Oxide, and Zinc White); as yellow particles, inorganic pigments (e.g. Yellow Iron Oxide, Cadmium Yellow, Titanium Yellow, Chrome Yellow, and Chrome Yellow) and organic pigments, such as insoluble azo compounds (e.g. Fast Yellow), condensed azo compounds (e.g. Chromophthal Yellow), azo complex salts (e.g. Benzimidazolone Azo Yellow), condensed polycyclics (e.g. Flavans Yellow), Hansa Yellow, naphthol yellow, nitro compounds, and pigment yellow; as yellowish brown particles, inorganic pigments (e.g. Molybdate Orange) and organic pigments, such as azo complex salts (e.g. Benzimidazolone Azo Orange) and condensed polycyclics (e.g. Pelinon Orange); as red particles, inorganic pigments (e.g. Ferric Oxide Red and Cadmium Red) and organic pigments, such as dyeing lakes (e.g. Madder Lake), soluble azo compounds (e.g. Lake Red), insoluble azo compounds (e.g. naphthol red), condensed azo compounds, (e.g. Chromophthalo Scarlet Red), condensed polycyclics (e.g. Tioindigo Voldor), quinacridone pigments (e.g. Cinquasia Red Y and Fastpermanent Red), and azo pigments (e.g. Permanent Red and Fast Slow Red); as purple particles, inorganic pigments (e.g. Manganese Violet) and organic pigments, such as dyeing lakes (e.g. Rhodamine Lake) and condensed polycyclics (e.g. Dioxadine Violet); as blue particles, inorganic pigments (e.g. Iron Blue, Ultramarine, Cobalt Blue, and Cerlian Blue) and organic pigments, such as phthalocyanines (e.g. Phthalocyanine Blue), indanthrenes (e.g. Indanthrene Blue), and alkali blue; as green particles, inorganic pigments (e.g. Emerald Green, Chrome Green, Chromium Oxide, and Viridian) and organic pigments, such as azo complex salts (e.g. Nickel Azo Yellow), nitroso compounds (e.g. Pigment Green and Naphthol Green), and phthalocyanines (e.g. Phthalocyanine Green); and as black particles other than the above Carbon Black and Titanium Black, inorganic pigments (e.g. Iron Black) and organic pigments (e.g. Aniline Black). These may be used either alone respectively or in combinations with each other.

Although there is no especial limitation on the particle diameters of the electrophoretic fine particles, their volume-average particle diameter is favorably in the range of 0.1 to 5 μm, more favorably 0.2 to 3 μm. In the case where the above particle diameter (volume-average particle diameter) is smaller than 0.1 μm, there is a possibility that: the hiding performance may not sufficiently be obtained in a displaying portion of the electrophoretic displays, thus resulting in low coloring degree and therefore in failure to obtain electrophoretic displays having high contrast. In the case where the above particle diameter (volume-average particle diameter) is larger than 5 μm, there is a possibility that there may occur necessity to raise the coloring degree of the particles themselves (the pigment concentration) more than is necessary, and besides, there is also a possibility that the smooth electrophoretic property of the fine particles may be lowered.

The above dispersion liquid can include some other component besides the above solvent and electrophoretic fine particles when the occasion demands. However, there is no especial limitation on such as its kind. Examples of the above other component include dispersants. The dispersants may be included either before or after the electrophoretic fine particles are dispersed into the solvent. Thus, there is no especial limitation.

There is no especial limitation on the above dispersants. However, the dispersants will do if they are dispersants usable conventionally and generally for assisting the particles in being dispersed in the solvent. Specific favorable examples thereof include those which are soluble in the dispersion liquid, such as: anionic surfactants, cationic surfactants, amphoteric surfactants, nonionic surfactants, fluorosurfactants, sorbitan fatty acid ester surfactants (e.g. sorbitan sesquioleate), dispersants (e.g. block polymers and graft polymers), and various coupling agents. These may be used either alone respectively or in combinations with each other. Of the above dispersants, the coupling agents are more favorable because they give good dispersing stability also when the electrical charges are applied. If the fine particles are treated with the coupling agents, a coating layer of the coupling agents is formed on surfaces of the fine particles.

There is no especial limitation on the kinds of the above coupling agents. Favorable examples thereof include: (1) silane coupling agents; (2) titanate coupling agents; (3) aluminum coupling agents; (4) vinyl-group-containing coupling agents; (5) coupling agents containing at least one group selected from among an amino group, a quaternary ammonium salt, a carboxyl group, and a phosphoric acid group; (6) coupling agents containing an amino group or a glycidyl group at their end; and (7) organodisilazanes. The titanate coupling agents and the aluminum coupling agents are more favorable. Coupling agents belonging to the above various coupling agents and further containing a long-chain alkyl group are still more favorable. Titanate coupling agents and aluminum coupling agents further containing a long-chain alkyl group are particularly favorable. The above coupling agents may be used either alone respectively or in combinations with each other.

As is mentioned above, the reason that the coupling agents containing a long-chain alkyl group are favorable can be exemplified by such that: the affinity is raised by such as long-chain-alkylbenzenes which are high safe solvents, and therefore such coupling agents have high effects of raising the dispersing stability of the electrophoretic fine particles.

Although there is no especial limitation on methods for dispersing the electrophoretic fine particles into the solvent in the case of obtaining the above dispersion liquid, it is enough that this method is a method as conventionally used when desirable particles are dispersed into some solvent. Specific favorable examples thereof include: a method that involves the steps of charging an ultrasonic bath with such as the electrophoretic fine particles, the solvent, and the coupling agent as starting components, and then ultrasonically dispersing the resultant mixture under stirred conditions; a method that involves the step of making a dispersion with a dispersing machine such as a paint shaker, a ball mill, and a sand grind mill; a dry method that involves the step of, while forcibly stirring the solvent and the fine particles with such as a V-blender, spraying the coupling agent thereto by dry air or nitrogen gas; a wet method that involves the steps of properly dispersing the fine particles into the solvent to thereby form a slurry, and then adding thereto the coupling agent; and a spraying method that involves the step of, while vigorously stirring the preheated solvent and fine particles, spraying the coupling agent thereto.

Though not especially limited, the shape of the microcapsule according to the present invention is favorably a particulate shape such as spherical shape.

Though not especially limited, the particle diameter of the microcapsule according to the present invention is, specifically, favorably in the range of 1 to 1,000 μm, more favorably 5 to 800 μm, still more favorably 10 to 500 μm. In the case where the particle diameter of the microcapsule is smaller than 1 μm, there is a possibility that only a small amount may be enmicrocapsulated, thus resulting in poor capsulation effects. In the case where the particle diameter of the microcapsule is larger than 1,000 μm, there is a possibility that the properties which are usually demanded to microcapsules cannot be retained, or that the strength of the microcapsule may be difficult to control.

For the purpose of producing the microcapsule according to the present invention, it is possible to favorably adopt conventional and publicly known production processes including the microcapsulation step, of which the specific examples include so-called interfacial precipitation methods (e.g. a coacervation method (phase separation method), a method by drying in liquids, a melting-decomposition-cooling method, a spray-drying method, a pan-coating method, a covering method by suspension in gases, and a powdery bed method) and so-called interfacial reaction methods (e.g. an interfacial polymerization method, an In-situ polymerization method, a coating-film (covering) method by curing in liquids (orifice method), and an interfacial reaction method (inorganochemical reaction method)). Of the above, the coacervation method, the In-situ polymerization method, the interfacial polymerization method, and the melting-decomposition-cooling method are more favorable. In these production processes, generally, the microcapsulation is carried out in the presence of an aqueous medium, thereby obtaining a preparation liquid including the microcapsules and the aqueous medium. Furthermore, the coacervation method is particularly favorable in that the thickness of the capsule shell is easier to control and in that a multilayered shell can be formed if necessary.

In the microcapsulation step of the above various production processes, the aforementioned liquid substance is used as the core substance being encapsulated in the capsule shell, and materials obtained by making conventional publicly known starting materials for the capsule shell contain the aforementioned fine particles are used as the starting materials for the capsule shell referred to in the present invention. Such a method makes it possible to extremely easily obtain the microcapsule according to the present invention and is therefore favorable.

In the case where the materials obtained by making conventional publicly known starting materials for the capsule shell contain the fine particles are used as the starting materials for the capsule shell in the microcapsulation step, the content of the fine particles relative to the entire starting materials for the capsule shell will do if it is appropriately set so that the content of the fine particles relative to the capsule shell of the resultant microcapsule will be in the aforementioned range. Thus, there is no especial limitation. However, the content of the fine particles relative to the entire starting materials for the capsule shell is, for example, favorably in the range of 0.01 to 5 weight %, more favorably 0.05 to 5 weight %, still more favorably 0.1 to 5 weight %. Outside the above range, there is a possibility that the content of the fine particles relative to the capsule shell of the resultant microcapsule may not be in the aforementioned range.

For the purpose of carrying out the microcapsulation step, the liquid substance referred to in the present invention needs to be brought into a state as the core substance (e.g. the form of liquid drops). As to its method, the liquid substance may be formed into the liquid drops in a gas phase by carrying out such as spraying or dropping of the liquid substance or by using such as orifice. Or the liquid substance may be formed into the liquid drops by dispersing the liquid substance into an aqueous or non-aqueous medium. Thus, there is no especial limitation. In the case where the aforementioned coacervation method, In-situ polymerization method, interfacial polymerization method, and melting-decomposition-cooling method are adopted, it is favorable that the liquid substance is formed into the liquid drops by dispersing the liquid substance into the aqueous medium. For example, in the coacervation method, generally, the aforementioned liquid substance is dispersed into the aqueous medium, and then the starting materials for the capsule shell are added to this aqueous medium, whereby the aforementioned shell containing the fine particles is formed on the surfaces of the dispersed liquid substance.

Although there is no especial limitation on the aqueous medium used when the liquid substance is dispersed, yet favorable usable examples thereof include: water; mixed liquids of water and hydrophilic solvents (e.g. alcohols, ketones, esters, and glycols); solutions as obtained by dissolving water-soluble polymers (e.g. PVA (polyvinyl alcohol), CMC (carboxymethyl cellulose), gelatins, and gum arabic) into water; solutions as obtained by adding surfactants (e.g. anionic surfactants, cationic surfactants, and nonionic surfactants) to water; or liquids as obtained by combining these aqueous mediums. In addition, although there is no especial limitation on the amount of the liquid substance to be dispersed into the aqueous medium, yet specifically this liquid substance is favorably used in an amount of 20 to 200 parts by weight, more favorably 30 to 150 parts by weight, per 100 parts by weight of the aqueous medium. In the case where the above amount is smaller than 20 parts by weight, there is a possibility that the resultant microcapsules may have such a broad particle diameter distribution as to cause the lowering of the production efficiency. In the case where the above amount is larger than 200 parts by weight, there is a possibility that: a reversed suspension may be formed, thus resulting in failure to product the microcapsules.

Although there is no especial limitation on the amount of the starting materials for the fine-particle-containing capsule shell being used in the microcapsulation step, yet this amount is specifically in the range of favorably 1 to 50 parts by weight, more favorably 5 to 30 parts by weight, per 1 part by weight of the liquid substance being used as the core substance. In the case where the above amount to be used is outside the above range, there is a possibility that the thickness of the capsule shell in the resultant microcapsule may not come into the aforementioned range.

When the microcapsulation step is carried out, other components may appropriately be used besides the starting materials for the fine-particle-containing capsule shell, the liquid substance, and the aqueous or non-aqueous medium which is used when the occasion demands.

After having been prepared by the microcapsulation step, the microcapsule is isolated by such as filtration, if necessary. For example, in the case where the microcapsulation step has been carried out by dispersing the liquid substance into such as aqueous medium, the microcapsule is separated from such as aqueous medium by suction filtration or spontaneous filtration after the preparation of the microcapsule. In the case where the microcapsule according to the present invention is filtered, the time needed for the above filtration can greatly be shortened, thus resulting in great merits in point of the economical advantages and the productivity.

After the isolation, favorably, the microcapsule is classified by conventional publicly known methods so as to have a desired particle diameter distribution.

In addition, for enhancing the product quality by removal of impurities, it is also favorable to carry out an operation of washing the resultant microcapsule.

The microcapsule according to the present invention, for example, can favorably be employed for various uses and products such as enmicrocapsulated liquid crystals, capsule type adhesives, capsule type cosmetics, microcapsule type electrophoretic displays, and microcapsule type liquid crystal displays, and besides, can favorably be employed also for hitherto publicly known various uses and products.

For example, in the case where used for the capsule type adhesives, the microcapsule according to the present invention can be utilized for adhesives for such as pressure-sensitive capsule systems, thermosensitive capsule systems, and reactive capsule systems, and gives a nontacky dried surface, and can be incorporated into a film. By using the microcapsule according to the present invention for the capsule type adhesives in this way, it is possible to obtain effects excellent also in such as preservation stability without problems of such as cracking and bleeding-out in the coating step for forming a film.

[Sheet]:

As is aforementioned, the sheet according to the present invention is a sheet (first sheet) comprising the above microcapsules according to the present invention and a binder resin or a sheet (second sheet) comprising the above microcapsules according to the present invention and a base material.

The first sheet may be either a sheet (sheet A) consisting of a layer including the above microcapsules according to the present invention and the binder resin or a sheet (sheet B) formed by uniting this layer with some film-shaped or sheet-shaped base material. Thus, there is no especial limitation. However, the latter form (sheet B) is preferable for the reasons such that the preparation method is easy and that the preparation can be carried out with the properties of the microcapsules remaining retained easily.

Examples of processes for preparing the first sheet include a process including the steps of: mixing the above microcapsules according to the present invention and the binder resin (a case where the binder resin is a resin solution is also included) together (if necessary, further mixing them with such as deionized water to thereby adjust the entire solid component concentration) to thereby form a paint; and then coating this paint onto the film-shaped or sheet-shaped base material; and then drying the coated paint; thus obtaining the sheet. After the above drying step, if only the coating layer is separated by peeling it off from the base material, then the aforementioned sheet A can be obtained and, if this separation is not carried out, then the aforementioned sheet B can be obtained.

Though not especially limited, the microcapsule concentration in the paint as formed in the above way is favorably in the range of 30 to 70 weight %, more favorably 30 to 60 weight %, still more favorably 30 to 55 weight %. If the microcapsule concentration is in the above range, then, for example, in the case where the sheet according to the present invention is used for electrophoretic displays, there can be obtained a product such that the microcapsules are arranged in a layer densely by the side of each other on an electrode film, whereby excellent product quality can be achieved.

The viscosity of the above paint is favorably in the range of 500 to 5,000 mPa·s, more favorably 800 to 4,000 mPa·s, still more favorably 800 to 3,000 mPa·s. If the viscosity of the paint is in the above range, then there can be obtained effects such that the microcapsules can be arranged in a layer with no space between them on the base material, whereby there is finished a coating film in which the microcapsules are in a densely packed state.

The second sheet is not a sheet containing the binder resin like the first sheet, but a sheet such that the microcapsules have firmly adhered directly to the base material and have united therewith. If the sheet is such a sheet, it may further include other components besides the microcapsules and the base material.

Examples of processes for preparing the second sheet include a process including the steps of: mixing the above microcapsules according to the present invention with such as deionized water to thereby adjust the entire solid component concentration to thereby form a paint; and then coating this paint onto the film-shaped or sheet-shaped base material; and then drying the coated paint; thus obtaining the sheet. Incidentally, as is aforementioned, as to the microcapsules used for the second sheet, microcapsules such that the fine particles contained in the shell are the organic fine particles (preferably, fine polymer particles) are favorable in that such microcapsules can be made to adhere sufficiently firmly to the base material even if no binder resin is used.

The processes for preparing the above first and second sheets may use such as dispersants, viscosity-adjusting agents, leveling agents, antiseptics, and defoamers, if necessary.

Though not especially limited, the method for coating the above paint onto the base material may, for example, be either a method in which the base materials are one by one coated using such as applicators and blade coaters or a method in which the base material is continuously coated using continuous coating machines such as multicoaters, and they will do if they are selected appropriately for the necessity.

Also up to now, sheets involving the use of microcapsules have been obtained by such preparation processes as cited above as examples, and the obtained sheets have been employed for various uses. However, hitherto, when a paint is formed by mixing the microcapsules and the binder resin (and further a solvent being used if necessary) together or by mixing the microcapsules and the solvent together or when the formed paint is coated, then the damage to the microcapsules or their destruction has often been caused by external loads such as stirring impact and frictional pressure due to such as paint-supplying pumps or coaters. In addition, there has also been a case where the bleeding-out of the encapsulated liquid substance occurs excessively or more than is necessary. However, as to the sheet according to the present invention, because the above microcapsules according to the present invention which can solve those problems are used, the sheet according to the present invention is strong also to the above external loads, and the damage to the microcapsules or their destruction occurs extremely little, and troubles can greatly be prevented from occurring in the coating step.

The sheet according to the present invention can be employed for the same uses as of hitherto publicly known sheets involving the use of microcapsules (e.g. non-carbon paper, pressure-measuring films). In addition, this sheet can favorably be used also in the case where electrophoretic displays are produced.

In the case where the sheet according to the present invention is used for the electrophoretic displays, the aforementioned sheet A will do if it is used in the form laminated between two opposite electrode films. In addition, the aforementioned sheet B and second sheet would be permitted to be used either in the form such that: one of the above electrode films is beforehand used as the base material in the preparation of these sheets, and then the coating layer of each of these sheets is laminated with the other electrode film, or in the form such that: a film other than the electrode films is used as the base material in the preparation of the above sheets, and then these sheets are laminated between the two opposite electrode films. Thus, there is no especial limitation. As the above electrode films, it is favorable to use transparent electrode films (e.g. PET films with ITO).

[Electrophoretic Display]:

As is aforementioned, the electrophoretic display according to the present invention is a device having as an essential constitutional portion a constitutional portion which includes opposite electrode films and the aforementioned microcapsules for electrophoretic displays (namely, the above microcapsules according to the present invention wherein the liquid substance encapsulated in the capsule shell is the "dispersion liquid including a solvent and electrophoretic fine particles that are dispersed in the solvent"), wherein at least either one of the opposite electrode films is transparent, and wherein the microcapsules are disposed between the opposite electrode films. Incidentally, the other constitutional portions of the electrophoretic display according to the present invention are not especially limited. Examples thereof include a power source circuit and a driving circuit. However, as these other constitutional portions, there can be adopted the same as those which are used as constitutional portions of publicly known electrophoretic displays.

The electrophoretic display according to the present invention is such that, by applying a controlled voltage between the opposite electrodes of the electrophoretic display, the orientations and positions of the electrophoretic fine particles in the microcapsules can be changed to give the optical reflection property a change to thereby cause the electrophoretic display to make a needed displaying action.

In the case where the electrophoretic display according to the present invention is produced, for example, there can favorably be cited a process including the steps of: mixing the aforementioned microcapsules for electrophoretic displays with such as binder resin to thereby form a paint; and then coating this paint onto an electrode film; and then laminating another electrode film onto the resultant coated surface (on which the microcapsules have been disposed), for example, while heating them and giving them pressure. In addition, there can also be cited a process including the steps of: preparing a sheet by molding a mixture of the microcapsules with such as binder resin into a sheet shape or by coating this mixture onto a filmy base material other than the electrode films; and then laminating the prepared sheet between two opposite electrode films.

Furthermore, even if the binder resin is not used in the above way, the electrophoretic display can be produced. For example, there can also be cited a process including the steps of: mixing the aforementioned microcapsules for electrophoretic displays with such as deionized water to thereby adjust the solid content to thereby form a paint; and then coating this paint onto an electrode film; and then laminating another electrode film onto the resultant coated surface (on which the microcapsules have been disposed), for example, while heating them and giving them pressure; and further, there can also be cited a process including the steps of: forming a paint in the same way as the above; and then preparing a sheet by coating this paint onto a filmy base material other than the electrode films; and then laminating the prepared sheet between two opposite electrode films. Incidentally, as is aforementioned, as to the microcapsules used in the case where the electrophoretic display is produced without using the binder resin, microcapsules such that the fine particles contained in the shell are the organic fine particles (preferably, fine polymer particles) are favorable in that such microcapsules can be made to adhere sufficiently firmly to the base material even if no binder resin is used.

In any of the above production processes, it is needed that at least either one of the opposite electrode films is a transparent electrode (e.g. PET film with ITO).

Usually, for obtaining an electrophoretic display of stable excellent displaying quality, it is necessary to make the microcapsules adhere firmly to the electrode film, because, if the firm adhesion to the electrode is poor, then there occur such as deterioration of respondability of the electrophoretic fine particles and deterioration of contrast. For enhancing this firm adhesion, usually, it is necessary to make the temperature or pressure high in the laminating step. However, hitherto, the microcapsules have been damaged or destroyed due to such a high temperature or pressure. In addition, there has been a case where the encapsulated liquid substance bleeds out excessively or more than is necessary. The damage to the microcapsules or their destruction or the bleeding-out therefrom causes remarkable deterioration of the image quality (e.g. a lack of displaying of the electrophoretic display). However, as to the electrophoretic display according to the present invention, there are used the above microcapsules according to the present invention for electrophoretic displays, namely, the microcapsules for electrophoretic displays of which the capsule shells contain the fine particles having the specific particle diameters. Therefore, the damage to the microcapsules or their destruction or the bleeding-out therefrom in the laminating step can greatly be reduced. Furthermore, by selecting the above fine particles as to their materials and properties appropriately for the necessity, the firm adhesion to the electrode film can still more be enhanced. Therefore, in such a case, the lamination can be carried out so that the excellent firm adhesion can be possessed even in a state where conditions such as temperature and pressure are made milder.

Further surprisingly, when compared with the electrophoretic display produced using the binder resin, the electrophoretic display produced by the aforementioned process not using the binder resin enables sufficient migration of the electrophoretic fine particles in the microcapsules even if the applied voltage is lower. In the case where the microcapsules of which the shells contain the fine particles are not used like in the present invention, there is adopted an art in which: the binder resin is essentially used for this resin to sufficiently secure the firm adhesion of the microcapsules to the base material and further for this resin to prevent the bleeding out of the microcapsules in the electrophoretic display or to reinforce the lowness of the physical strength of the microcapsules lest the microcapsules should be damaged or destroyed (e.g. refer to JP-A-526812/2002 (Kohyo)). However, as to an electrophoretic display produced by adopting such an art, the binder resin lies between the microcapsule and the electrode to thus act unfavorably as a resistor. Therefore, a high voltage needs to be applied for sufficiently securing the migrating ability of the electrophoretic fine particles. As to the microcapsule according to the present invention, its shell contains the fine particles (favorably the organic fine particles, more favorably the fine polymer particles). Therefore, as is aforementioned, it is possible to achieve the prevention of the bleeding-out and the enhancement of the physical strength. Besides, the presence of the fine particles enables the sufficient firm adhesion to the base material even if the binder resin is not used. Therefore, it is possible to produce an electrophoretic display which is excellent in the economical advantages and also in various qualities of displaying (e.g. respondability of displaying, contrast).

As to the electrophoretic display according to the present invention, though not especially limited, the particle diameters of the microcapsules to be used are favorably in the range of 30 to 200 μm, more favorably 50 to 150 μm.

As to the electrophoretic display according to the present invention, though not especially limited, the clearance between the opposite electrode films is favorably in the range of 30 to 150 μm, more favorably 30 to 120 μm.

(Effects of the Invention):

The present invention can provide a microcapsule which can effectively and easily achieve: the prevention and adjustment of the bleeding-out of the encapsulated liquid substance from the capsule shell; and the enhancement and adjustment of the physical strength of the microcapsule. In the case where the organic fine particles (favorably, fine polymer particles) are used as the fine particles contained in the above shell, the firm adhesion of the microcapsules to the base material can be sufficiently secured or still more enhanced, so that the microcapsules can be made to sufficiently firmly adhere to the base material even in the case where no binder resin is used, to say nothing of the case where the microcapsules are mixed with the binder resin and then made to firmly adhere to the base material.

The present invention can provide a sheet and an electrophoretic display, both of which involve using the above microcapsules.

DETAILED DESCRIPTION OF THE PREFERRED EMBODIMENTS

Hereinafter, the present invention is more specifically illustrated by the following Examples of some preferred embodiments. However, the present invention is not limited to these in any way. Incidentally, hereinafter, for the sake of convenience, the unit "part(s) by weight" may be referred to simply as "part(s)". In addition, the units "weight %" and "liter(s)" may be referred to simply as "wt %" and "L" respectively.

EXAMPLE 1-1

Into 100 g of Highsol SAS296 (produced by Nisseki Kagaku Co., Ltd.), 6 g of anthraquinone blue oil dye was dissolved, thus obtaining a blue-colored hydrophobic liquid (1).

Under stirring with a disper (produced by Tokushu Kika Kogyo Co., Ltd., product name: ROBOMICS), 106 g of the hydrophobic liquid (1) as heated to 50° C. was added to an aqueous solution which had beforehand been prepared by dissolving 3 g of gum arabic and 6 g of gelatin into 60 g of water and then maintained at 43° C. The stirring speed was gradually raised to stir the resultant mixture at 1,050 r.p.m. for 60 minutes, thus obtaining a suspension.

While 300 mL of warm water of 43° C. and 7.8 g of a polymer emulsion (containing fine polymer particles which the capsule shell was to be made to contain) (produced by Dai-ichi Kogyo Seiyaku Co., Ltd., product name: Super Flex 700 (particle diameters of fine polymer particles: 90 nm, solid content: 35 wt %)) were added to this suspension, the stirring speed was gradually lowered to 500 r.p.m. Furthermore, 0.75 mL of 10% $Na_2CO_3$ was added thereto, and thereafter the resultant mixture was maintained for 30 minutes.

After the above maintenance for 30 minutes, 11 mL of 10% acetic acid solution was added thereto at a constant rate over a period of 25 minutes, and then the resultant mixture was cooled to not higher than 10° C.

The mixture was maintained in the cooled state for 2 hours, and then 3 mL of 37% formalin was added thereto, and then 22 mL of 10% $Na_2CO_3$ was further added thereto at a constant rate over a period of 25 minutes.

Thereafter, the resultant mixture was cooled to ordinary temperature under stirred conditions and then left untouched for 20 hours to carry out aging, thus obtaining a dispersion of microcapsules (11).

The particle diameters of the microcapsules (11) were measured with a laser-diffraction/scattering type particle-diameter-distribution measurement apparatus, (produced by Horiba Seisakusho Co., Ltd., product name: LA-910). As a result, the volume-average particle diameter was 67 μm.

EXAMPLE 1-2

A blue-colored hydrophobic liquid (2) was obtained by the same procedure as of Example 1-1 except to replace the Highsol SAS296 with an alkylbenzene.

Under stirring with a homomixer (produced by Tokushu Kika Kogyo Co., Ltd., product name: ROBOMICS), 106 g of the hydrophobic liquid (2) as heated to 50° C. was added to an aqueous solution which had beforehand been prepared by dissolving 6 g of gum arabic and 9 g of gelatin into 100 g of water and then maintained at 43° C. The stirring speed was gradually raised to stir the resultant mixture at 3,000 r.p.m. for 30 minutes, thus obtaining a suspension.

While 300 mL of warm water of 43° C. and 14 g of an acrylic polymer emulsion (containing fine polymer particles which the capsule shell was to be made to contain) (particle diameters of fine polymer particles: 450 nm, solid content: 45 wt %) were added to this suspension, the stirring speed was gradually lowered to 1,000 r.p.m. The stirring was changed to paddle stirring and, under conditions where the entirety was uniformly well stirred, 0.75 mL of 10% $Na_2CO_3$ was further added thereto, and thereafter the resultant mixture was maintained for 30 minutes.

After the above maintenance for 30 minutes, 15 mL of 10% acetic acid solution was added thereto at a constant rate over a period of 30 minutes, and then the resultant mixture was cooled to not higher than 10° C.

The mixture was maintained in the cooled state for 2 hours, and then 5 mL of 37% formalin was added thereto, and then 24 mL of 10% $Na_2CO_3$ was further added thereto at a constant rate over a period of 25 minutes.

Thereafter, the resultant mixture was cooled to ordinary temperature under stirred conditions and then left untouched for 20 hours to carry out aging, thus obtaining a dispersion of microcapsules (12).

The particle diameters of the microcapsules (12) were measured in the same way as of Example 1-1. As a result, the volume-average particle diameter was 23 μm.

COMPARATIVE EXAMPLE 1-1

A dispersion of microcapsules (c11) was obtained by the same procedure as of Example 1-1 except that the amount of the gum arabic being used was changed from 3 g to 6 g and that the polymer emulsion (produced by Dai-ichi Kogyo Seiyaku Co., Ltd., product name: Super Flex 700) was not used.

The particle diameters of the microcapsules (c11) were measured in the same way as of Example 1-1. As a result, the volume-average particle diameter was 65 μm.

COMPARATIVE EXAMPLE 1-2

A dispersion of microcapsules (c12) was obtained by the same procedure as of Example 1-2 except that the amount of the gum arabic being used was changed from 6 g to 9 g and that the acrylic polymer emulsion (particle diameters of fine polymer particles: 450 nm, solid content: 45 wt %) was not used.

The particle diameters of the microcapsules (c12) were measured in the same way as of Example 1-1. As a result, the volume-average particle diameter was 21 μm.

EXAMPLE 1-3

A four-necked flask of 500 mL was charged with 30 g of titanium oxide (produced by Ishihara Sangyo Kaisha, Ltd., product name: Tipaque CR-97), 261 g of an alkylbenzene, and 2 g of titanate coupling agent (produced by Ajinomoto Co., Inc., product name: Plemact TTS), and then these materials were mixed by stirring. Thereafter, the flask was put into an ultrasonic bath (produced by Yamato Co., Ltd., product name: BRANSON 5210) of 55° C., and then the contents of the flask were subjected to a ultrasonically dispersing treatment under stirred conditions for 2 hours, thus obtaining a titanium oxide dispersion liquid.

Into this titanium oxide dispersion liquid, 6 g of anthraquinone blue oil dye was dissolved, thus obtaining a blue-colored, electrophoretic fine particle dispersion liquid (3).

Under stirring with a disper (produced by Tokushu Kika Kogyo Co., Ltd., product name: ROBOMICS), 105 g of the electrophoretic fine particle dispersion liquid (3) as heated to 55° C. was added to an aqueous solution which had beforehand been prepared by dissolving 5.5 g of gum arabic and 5.5 g of gelatin into 60 g of water and then maintained at 43° C. The stirring speed was gradually raised to stir the resultant mixture at 1,300 r.p.m. for 60 minutes, thus obtaining a suspension.

While 300 mL of warm water of 43° C. and 7.8 g of a polymer emulsion (containing fine polymer particles which the capsule shell was to be made to contain) (produced by Dai-ichi Kogyo Seiyaku Co., Ltd., product name: Super Flex 700 (particle diameters of fine polymer particles: 90 nm, solid content: 35 wt %, volume intrinsic resistance: $2.5 \times 10^{10}$ Ω·cm)) were added to this suspension, the stirring speed was gradually lowered to 500 r.p.m. Furthermore, 0.75 mL of 10% $Na_2CO_3$ was added thereto, and thereafter the resultant mixture was maintained for 30 minutes.

After the above maintenance for 30 minutes, 11 mL of 10% acetic acid solution was added thereto at a constant rate over a period of 25 minutes, and then the resultant mixture was cooled to not higher than 10° C.

The mixture was maintained in the cooled state for 2 hours, and then 3 mL of 37% formalin was added thereto, and then 22 mL of 10% $Na_2CO_3$ was further added thereto at a constant rate over a period of 25 minutes.

Thereafter, the resultant mixture was cooled to ordinary temperature under stirred conditions and then left untouched for 20 hours to carry out aging, thus obtaining a dispersion of microcapsules (13) for electrophoretic displays, wherein the microcapsules (13) encapsulated the electrophoretic fine particle dispersion liquid (3).

The particle diameters of the microcapsules (13) for electrophoretic displays were measured in the same way as of Example 1-1. As a result, the volume-average particle diameter was 68 μm.

EXAMPLE 1-4

A blue-colored, electrophoretic fine particle dispersion liquid (4) was obtained by the same procedure as of Example 1-3 except to replace the alkylbenzene with Highsol SAS296.

Under stirring with a disper (produced by Tokushu Kika Kogyo Co., Ltd., product name: ROBOMICS), 106 g of the electrophoretic fine particle dispersion liquid (4) as heated to 50° C. was added to an aqueous solution which had beforehand been prepared by dissolving 6 g of gum arabic and 9 g of gelatin into 100 g of water and then maintained at 43° C. The stirring speed was gradually raised to stir the resultant mixture at 1,050 r.p.m. for 30 minutes, thus obtaining a suspension.

While 300 mL of warm water of 43° C. and 17 g of a polymer emulsion (containing fine polymer particles which the capsule shell was to be made to contain) (produced by Dai-ichi Kogyo Seiyaku Co., Ltd., product name: Super Flex 300 (particle diameters of fine polymer particles: 70 nm, solid content: 30 wt %, volume intrinsic resistance: $2.3 \times 10^{8}$ Ω·cm)) were added to this suspension, the stirring speed was gradually lowered to 1,000 r.p.m. The stirring was changed to paddle stirring and, under conditions where the entirety was uniformly well stirred, 0.75 mL of 10% $Na_2CO_3$ was further added thereto, and thereafter the resultant mixture was maintained for 30 minutes.

After the above maintenance for 30 minutes, 15 mL of 10% acetic acid solution was added thereto at a constant rate over a period of 30 minutes, and then the resultant mixture was cooled to not higher than 10° C.

The mixture was maintained in the cooled state for 2 hours, and then 5 mL of 37% formalin was added thereto, and then 24 mL of 10% $Na_2CO_3$ was further added thereto at a constant rate over a period of 25 minutes.

Thereafter, the resultant mixture was cooled to ordinary temperature under stirred conditions and then left untouched for 20 hours to carry out aging, thus obtaining a dispersion of microcapsules (14) for electrophoretic displays, wherein the microcapsules (14) encapsulated the electrophoretic fine particle dispersion liquid (4).

The particle diameters of the microcapsules (14) for electrophoretic displays were measured in the same way as of Example 1-1. As a result, the volume-average particle diameter was 95 μm.

COMPARATIVE EXAMPLE 1-3

A dispersion of microcapsules (c13) for electrophoretic displays was obtained by the same procedure as of Example 1-3 except that the amount of the gum arabic being used was changed from 5.5 g to 6 g and that the polymer emulsion (produced by Dai-ichi Kogyo Seiyaku Co., Ltd., product name: Super Flex 700) was not used.

The particle diameters of the microcapsules (c13) for electrophoretic displays were measured in the same way as of Example 1-1. As a result, the volume-average particle diameter was 66 μm.

COMPARATIVE EXAMPLE 1-4

A dispersion of microcapsules (c14) for electrophoretic displays was obtained by the same procedure as of Example 1-4 except that the amount of the gum arabic being used was changed from 6 g to 9 g and that the polymer emulsion (produced by Dai-ichi Kogyo Seiyaku Co., Ltd., product name: Super Flex 300) was not used.

The particle diameters of the microcapsules (c14) for electrophoretic displays were measured in the same way as of Example 1-1. As a result, the volume-average particle diameter was 87 μm.

<Physical Strength of Microcapsules>:

Each of the resultant dispersions of the microcapsules (11) to (12) and (c11) to (c12) and of the microcapsules (13) to (14) and (c13) to (c14) for electrophoretic displays was subjected to suction filtration, thus obtaining each filtrated cake having a solid content of about 40 wt %.

To 50 g of each filtrated cake, there were added 6 g of a binder (solid content: 35 wt %) (acrylic emulsion, film formation temperature: 5° C.) and 17 g of water to thereby form a paint. This paint was coated onto a PET film of 250 μm in thickness with an applicator, and then air-dried for 30 minutes, and then dried at 100° C. for 10 minutes, thus obtaining microcapsules-coated MC films (1A) to (4A) and (c1A) to (c4A).

Next, a pencil hardness meter (produced by Yasuda Seiki Seisakusho K. K.) was used, and the above MC films were put on white ordinary paper with the microcapsules-coated side of each of the MC films down. Thereafter, loads of 50 g, 100 g, 200 g, and 300 g were applied from the PET film side by using a 7H pencil. Then, the color contamination degree to which the white ordinary paper dyed blue was observed, thereby evaluating the physical strength of each of the microcapsules (11) to (12) and (c11) to (c12) and the microcapsules (13) to (14) and (c13) to (c14) for electrophoretic displays on the following standards. Their results are shown in Table 1.

⊚: There is no dyeing.
○: There is extremely slight dyeing.
Δ: There is a little dyeing.
X: There is dyeing in a much bled state.

TABLE 1

| | Particle diameters of microcapsules (μm) | Physical strength | | | |
|---|---|---|---|---|---|
| | | 50 g | 100 g | 200 g | 300 g |
| Example 1-1 | 67 | ⊚ | ○ | Δ | X |
| Example 1-2 | 23 | ⊚ | ⊚ | ○ | Δ |
| Example 1-3 | 68 | ⊚ | ○ | Δ | X |
| Example 1-4 | 95 | ⊚ | ○ | Δ | Δ |
| Comparative Example 1-1 | 65 | ○ | Δ | X | X |
| Comparative Example 1-2 | 21 | ⊚ | ○ | X | X |
| Comparative Example 1-3 | 66 | ○ | Δ | X | X |
| Comparative Example 1-4 | 87 | ○ | X | X | X |

EXAMPLE 2-1

The dispersion of the microcapsules (13) for electrophoretic displays (having been obtained from Example 1-3) were passed through a mesh sieve having a mesh opening size of about 1.5 times the volume-average particle diameter, whereby coarse particles were removed. Thereafter, suction filtration was carried out to thereby isolate the microcapsules (13).

The isolated microcapsules (13) and an acrylic emulsion for binders were mixed together in a ratio of (acrylic emulsion for binders)/(microcapsules)=40 parts/100 parts, and further, deionized water was added thereto in such an amount that the solid component concentration would not be higher than 40 wt %, and they were mixed together, thus obtaining a coating liquid. This coating liquid was coated onto the ITO side of an ITO (transparent electrode)-having PET film as a base material by an applicator and thereafter dried at 90° C. for 10 minutes, thus obtaining a sheet (21) involving using the microcapsules (13).

EXAMPLE 2-2

A sheet (22), involving using the microcapsules (14), was obtained in the same way as of Example 2-1 except that the dispersion of the microcapsules (13) was replaced with the dispersion of the microcapsules (14) for electrophoretic displays (having been obtained from Example 1-4).

COMPARATIVE EXAMPLES 2-1 AND 2-2

A sheet (c21) involving using the microcapsules (c13), and a sheet (c22) involving using the microcapsules (c14), were obtained in the same way as of Example 2-1 except that the dispersion of the microcapsules (13) was replaced with the dispersion of the microcapsules (c13) for electrophoretic displays (having been obtained from Comparative Example 1-3) and the dispersion of the microcapsules (c14) for electrophoretic displays (having been obtained from Comparative Example 1-4) respectively.

EXAMPLES 2-3 AND 2-4

A sheet (23) involving using the microcapsules (13), and a sheet (24) involving using the microcapsules (14), were obtained in the same ways as of Examples 2-1 and 2-2 respectively except that the mixing ratio of the acrylic emulsion for binders was changed from 40 parts to 10 parts.

COMPARATIVE EXAMPLES 2-3 AND 2-4

A sheet (c23) involving using the microcapsules (c13), and a sheet (c24) involving using the microcapsules (c14), were obtained in the same ways as of Comparative Examples 2-1 and 2-2 respectively except that the mixing ratio of the acrylic emulsion for binders was changed from 40 parts to 10 parts.

EXAMPLE 2-5

In the same way as of Example 2-1, the microcapsules (13) was isolated from the dispersion of the microcapsules (13) for electrophoretic displays (having been obtained from Example 1-3).

To 100 parts of the isolated microcapsules (13), deionized water was added in such an amount that the solid component concentration would not be higher than 40 weight %, and they were mixed together (the acrylic emulsion for binders was not used), thus obtaining a coating liquid. This coating liquid was coated onto the ITO side of an ITO-having PET film as a base material by an applicator and thereafter dried at 90° C. for 10 minutes, thus obtaining a sheet (25) involving using the microcapsules (13).

EXAMPLE 2-6

A sheet (26), involving using the microcapsules (14), was obtained in the same way as of Example 2-5 except that the dispersion of the microcapsules (13) was replaced with the dispersion of the microcapsules (14) for electrophoretic displays (having been obtained from Example 1-4).

COMPARATIVE EXAMPLES 2-5 AND 2-6

A sheet (c25) involving using the microcapsules (c13), and a sheet (c26) involving using the microcapsules (c14), were obtained in the same ways as of Example 2-5 except that the dispersion of the microcapsules (13) was replaced with the dispersion of the microcapsules (c13) for electrophoretic displays (having been obtained from Comparative Example 1-3) and the dispersion of the microcapsules (c14) for electrophoretic displays (having been obtained from Comparative Example 1-4) respectively.

<Evaluation of Firm Adhesion of Sheet Involving using Microcapsules>:

(Firn Adhesion to Base Material):

A pressure-sensitive adhesive tape (produced by Sumitomo 3M Co., Ltd., product name: Scotch Band Tape) was stuck onto the dried coated side of each of the sheets (21) to (26) and (c21) to (c26). Thereafter, when the tape was slowly peeled off, the state was observed to evaluate the firm adhesion between the coating layer (layer comprising the microcapsules and the binder or comprising only the microcapsules) and the base material (ITO-having PET film) on the following standards. Their results are shown in Table 2.

◯: The coating layer was not peeled off from the base material at all.

Δ: The coating layer was partly peeled off from the base material.

×: Almost all the coating layer was peeled off from the base material.

(Firm Adhesion to Electrode Film):

What had separately been obtained by piling an ITO-having PET film as an electrode film further onto the dried coated side of each of the sheets (21) to (26) and (c21) to (c26) was put on a glass plate of 2 mm in thickness so that the piled film would be the upside, and then passed between the below-mentioned two rolls to thereby heat-press the above-mentioned piled film onto the above-mentioned coated side. Incidentally, of the above-mentioned two rolls, the upper one is a silicone rubber roll of 3 inches in roll diameter and heat-retained by a heat medium so as to have a roll surface temperature of 120° C. and driven so as to rotate at a feeding rate of 0.6 cm/minute in a state pressed onto the lower roll by an air pressure of 4 kg/cm$^2$ (clearance between rolls: 0 mm). The lower roll is not heated and is made to freely rotate, and its position is fixed.

When the above-mentioned piled film was slowly peeled off after the heat pressing, the state was observed to evaluate the firm adhesion between the coating layer and the above-mentioned piled film on the following standards. Their results are shown in Table 2.

◯: The above-mentioned piled film did not peel off or, if the peeling-off was forced, the coating layer (particularly, microcapsules therein) was destroyed.

Δ: The above-mentioned piled film partly peeled off, but considerably firmly adhered to the coating layer as a whole.

×: The above-mentioned piled film easily peeled off.

TABLE 2

| | Mixing ratio of microcapsules/binder (parts/parts) | Firm adhesion to base material | Firm adhesion to electrode film |
|---|---|---|---|
| Example 2-1 | 100/40 | ◯ | ◯ |
| Example 2-2 | ↑ | ◯ | ◯ |
| Comparative Example 2-1 | ↑ | ◯ | ◯ |
| Comparative Example 2-2 | ↑ | ◯ | ◯ |
| Example 2-3 | 100/10 | ◯ | ◯ |
| Example 2-4 | ↑ | ◯ | ◯ |
| Comparative Example 2-3 | ↑ | Δ | Δ |
| Comparative Example 2-4 | ↑ | Δ | Δ |
| Example 2-5 | 100/0 | ◯ | ◯ |
| Example 2-6 | ↑ | ◯ | ◯ |
| Comparative Example 2-5 | ↑ | × | × |
| Comparative Example 2-6 | ↑ | × | × |

EXAMPLE 3-1

An ITO-having PET film was separately piled onto the coated side of the sheet (21) (having been obtained from Example 2-1) so that the ITO side of the ITO-having PET film would contact with the above-mentioned coated side, and then they were laminated together by heating them and giving them pressure. Furthermore, leads were joined to the respective electrodes (ITO) of both PET films by using an electroconductive adhesive (produced by Fujikura Kasei K. K., product name: Electroconductives DOTITE), and then a power source was set, thus producing an electrophoretic display (31) having opposite electrodes.

EXAMPLES 3-2 TO 3-6

Electrophoretic displays (32) to (36) having opposite electrodes were produced in the same way as of Example 3-1 except that the sheet (21) was replaced with the sheets (22) to (26) (having been obtained from Examples 2-2 to 2-6) respectively.

COMPARATIVE EXAMPLES 3-1 TO 3-6

Electrophoretic displays (c31) to (c36) having opposite electrodes were produced in the same way as of Example 3-1 except that the sheet (21) was replaced with the sheets (c21) to (c26) (having been obtained from Comparative Examples 2-1 to 2-6) respectively.

Incidentally, as to the electrophoretic displays (c35) and (c36) produced from Comparative Examples 3-5 and 3-6, the microcapsules did not firmly adhere to the ITO-having PET film even if the lamination was carried out.

<Production of Electrophoretic Displays and Evaluation of their Image Quality>:

Each of the electrophoretic displays (31) to (36) and (c31) to (c36) was measured by the contrast after having applied a direct current voltage of 30 V between both electrodes for 1 second. As to the contrast, the reflectances of blue and white displays were measured with a Macbeth spectrophotometric densitometer, SpectroEye (produced by Gretag Macbeth), and the contrast was represented by the ratio between these reflectances (contrast=white reflectance/blue reflectance).

Their results are shown in Table 3.

TABLE 3

| | Ratio of microcapsules/binder (parts/parts) | Evaluation of image quality | | |
|---|---|---|---|---|
| | | White reflectance | Blue reflectance | Contrast |
| Example 3-1 | 100/40 | 16.7 | 7.9 | 2.1 |
| Example 3-2 | ↑ | 16.9 | 7.4 | 2.3 |
| Comparative Example 3-1 | ↑ | 16.2 | 8.1 | 2.0 |
| Comparative Example 3-2 | ↑ | 15.5 | 8.5 | 1.8 |
| Example 3-3 | 100/10 | 20.8 | 3.9 | 5.3 |
| Example 3-4 | ↑ | 21.5 | 3.2 | 6.7 |
| Comparative Example 3-3 | ↑ | 19.7 | 4.0 | 4.9 |
| Comparative Example 3-4 | ↑ | 18.8 | 5.9 | 3.2 |
| Example 3-5 | 100/0 | 20.8 | 3.5 | 5.9 |
| Example 3-6 | ↑ | 21.6 | 3.0 | 7.2 |
| Comparative Example 3-5 | ↑ | ※1 | ※1 | ※1 |
| Comparative Example 3-6 | ↑ | ※1 | ※1 | ※1 |

※1): The migrating ability of the electrophoretic fine particles was not seen, and the displaying was not done.

INDUSTRIAL APPLICATION

The microcapsule according to the present invention is, for example, favorable for various uses such as enmicrocapsulated liquid crystals, capsule type adhesives, capsule type cosmetics, microcapsule type electrophoretic displays, and microcapsule type liquid crystal displays, and besides, favorable also for hitherto publicly known various uses such as non-carbon paper and pressure-measuring films.

The sheet according to the present invention is, for example, favorable for the same uses as of hitherto publicly known sheets involving the use of microcapsules (e.g. non-carbon paper, pressure-measuring films). In addition, this sheet is favorable also as a constitutional part of such as microcapsule type electrophoretic displays and microcapsule type liquid crystal displays.

The electrophoretic display according to the present invention is favorable as an electrophoretic display having high quality of displaying.

What is claimed is:

1. A microcapsule, which is a microcapsule comprising a shell and a liquid substance that is encapsulated in the shell, with the microcapsule being characterized in that the shell contains organic polymer fine particles having particle diameters of not larger than 1 µm.

2. A microcapsule according to claim 1, wherein the liquid substance is a dispersion including a solvent and electrophoretic fine particles that are dispersed in the solvent.

3. An electrophoretic display, having as a constitutional portion a portion which includes opposite electrode films and microcapsules, wherein at least either one of the opposite electrode films is transparent, and wherein the microcapsules are disposed between the opposite electrode films, and wherein the microcapsules comprise a shell containing fine particles having a particle diameter of not larger than 1 µm, and a liquid substance encapsulated in the shell, the liquid substance being a dispersion including a solvent and electrophoretic fine particles dispersed in the solvent.

4. A sheet comprising a microcapsule and a binder resin, wherein said microcapsule comprises a shell and a liquid substance that is encapsulated in the shell, with the microcapsule being characterized in that the shell contains organic fine particles having particle diameters of not larger than 1 µm.

5. A sheet according to claim 4, wherein the organic fine particles are fine polymer particles.

6. A sheet according to claim 4, wherein the liquid substance is a dispersion including a solvent and electrophoretic fine particles that are dispersed in the solvent.

7. A sheet comprising a microcapsule and a base material, wherein said microcapsule comprises a shell and a liquid substance that is encapsulated in the shell, with the microcapsule being characterized in that the shell contains organic fine particles having particle diameters of not larger than 1 µm.

8. A sheet according to claim 7, wherein the organic fine particles are fine polymer particles.

9. A sheet according to claim 7, wherein the liquid substance is a dispersion including a solvent and electrophoretic fine particles that are dispersed in the solvent.

* * * * *